Figure 1:
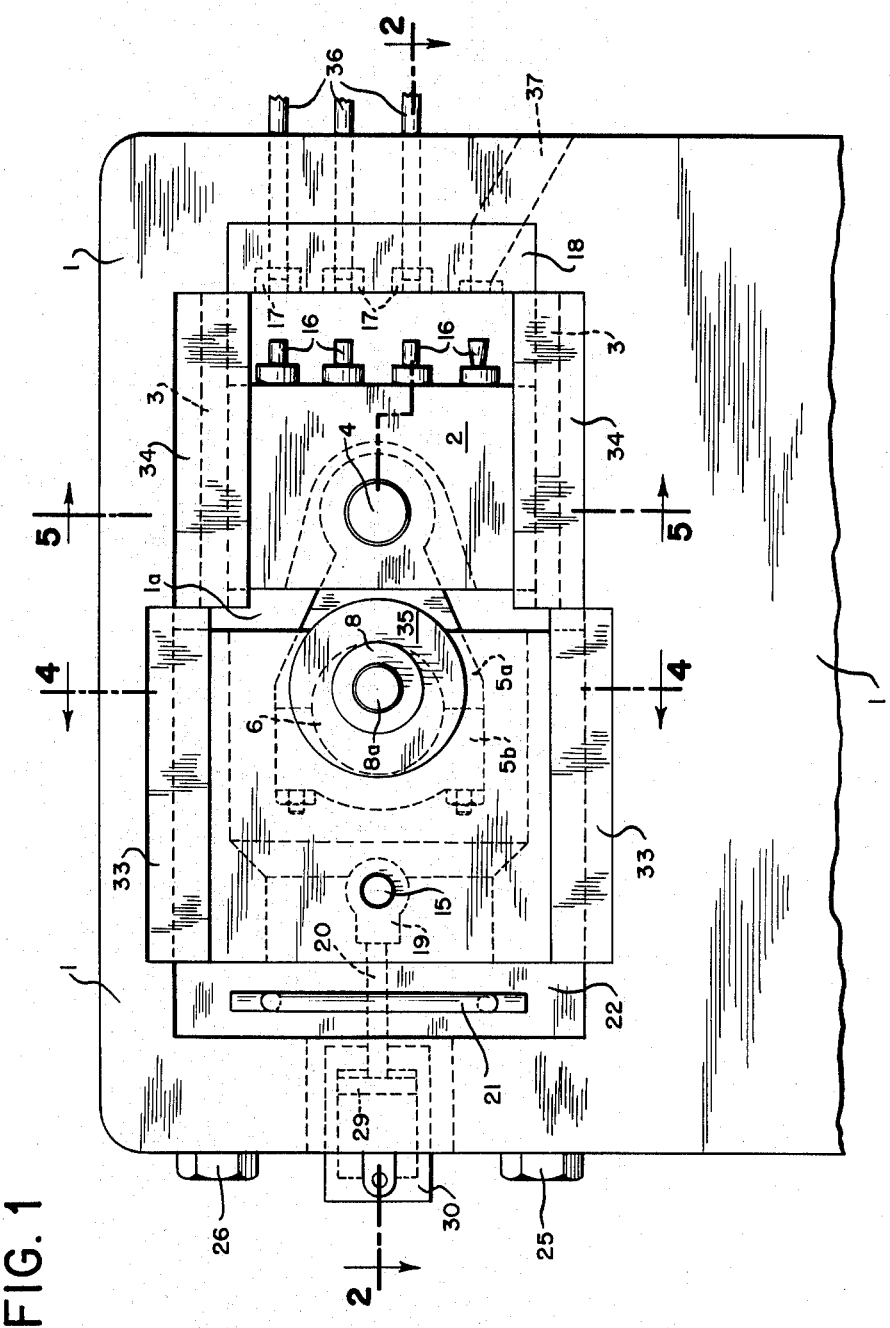

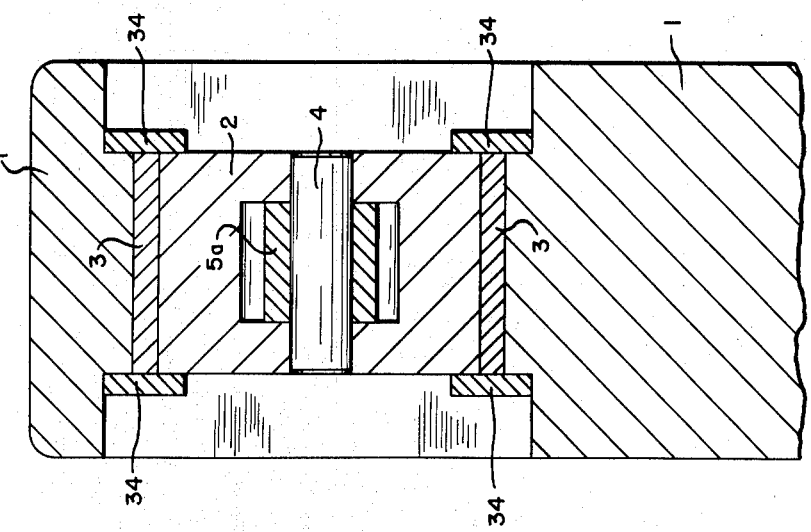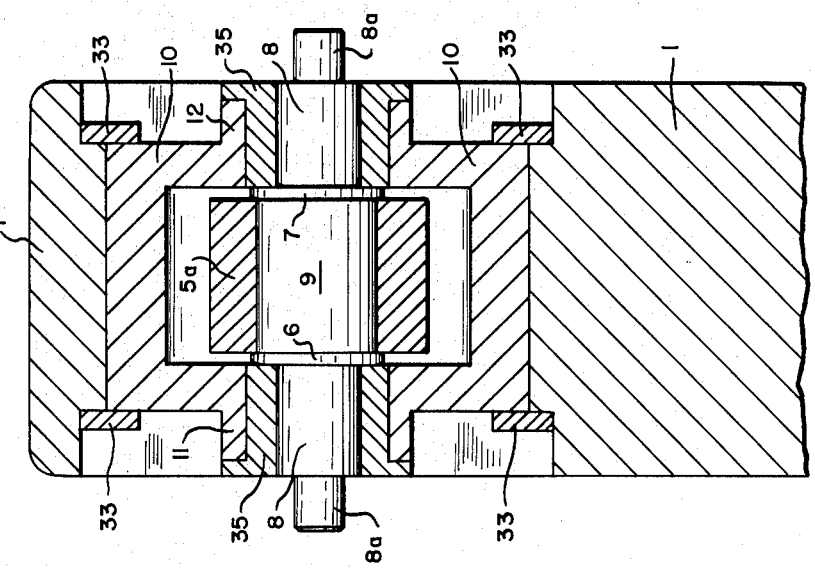

United States Patent Office 3,231,912
Patented Feb. 1, 1966

3,231,912
MACHINE FOR PRESSING OR PUNCHING
ARTICLES, SUCH AS NUTS
Gerardus C. van de Meerendonk, Helmond, Netherlands,
assignor to Nedschroef Octrooimaatschappij N.V.,
Helmond, Netherlands, a limited liability company of
the Netherlands
Filed Dec. 10, 1963, Ser. No. 329,466
Claims priority, application Netherlands Dec. 10, 1962,
286,484
8 Claims. (Cl. 10—76)

The present invention relates to improvements in machines of the type used for pressing, punching and forming article such as nuts, and other articles, in which the machine comprises a frame and a reciprocable carriage or tool slide movable toward and away from a fixed die block.

In machines of this type, the carriage is reciprocated by means of a crankshaft connected to the carriage or slide by a connecting rod. In such machines the crankshaft is rotatably mounted in fixed bearings mounted in the frame of the machine, and the carriage or slide is provided with working tools which are removably mounted in the front of the slide facing the die block.

In known machines of this type, it is often very difficult to change the tools in the slide or to remove an accidentally shifted or deformed article because of the relatively small work space available due to the relatively short stroke of the slide. In making machines of this type, it is usually regarded as an advantage to provide a short stroke in order to increase the speed of the machine, but this leaves a very inconveniently small space between the tool carriage or slide and the fixed die block, in which to work on or remove the tools carried by the slide.

Therefore, the primary object of the present invention is to overcome the difficulties referred to above and to provide a machine construction in which more adequate space may be provided for installing or changing the tools mounted in a tool slide or carrier, for example of short stroke.

A further object of the invention is to provide a construction which permits movement of the tool slide or carrier to a position to substantially increase the workspace available for changing the tools, and that without disconnecting the tool slide from the crankshaft.

In accordance with one embodiment of the invention, the crankshaft of the machine is provided with journals mounted in bearings which are movable relative to the frame of the machine in a direction such that the crankshaft and tool slide or carrier are movable away from the fixed die block to a substantially greater extent than the tool slide is movable during its normal reciprocation. The crankshaft bearings are advantageously movable in the direction of movement of the tool carriage, and means is provided for releasably securing the crankshaft bearings in the normal working position for the crankshaft.

In a construction in accordance with the invention, the means providing for the shifting or adjustment of the tool carrier and the crankshaft and its bearings relative to the frame comprises a removable filler plate or plates, placed in a space or spaces back of the bearings, preferably back of casings carrying the bearings, between them and the frame of the machine. The filler plate or plates have a thickness such that, when in place, they position the bearing casings and crankshaft in their normal operative positions, and, when removed, make available a greatly increased work space, when the crankshaft and carrier are retracted from their normal positions in the frame. Means is also preferably provided for holding the filler plate or plates in place and for tightening the bearings or casings and filler plate with respect to the frame of the machine. Draw bolts may be provided for this purpose.

The improved machine according to the invention also preferably includes mechanism fixed to the frame of the machine for displacing the displaceable bearing casings, crankshaft and tool slide when the filler plate or plates are removed.

Figure 2:
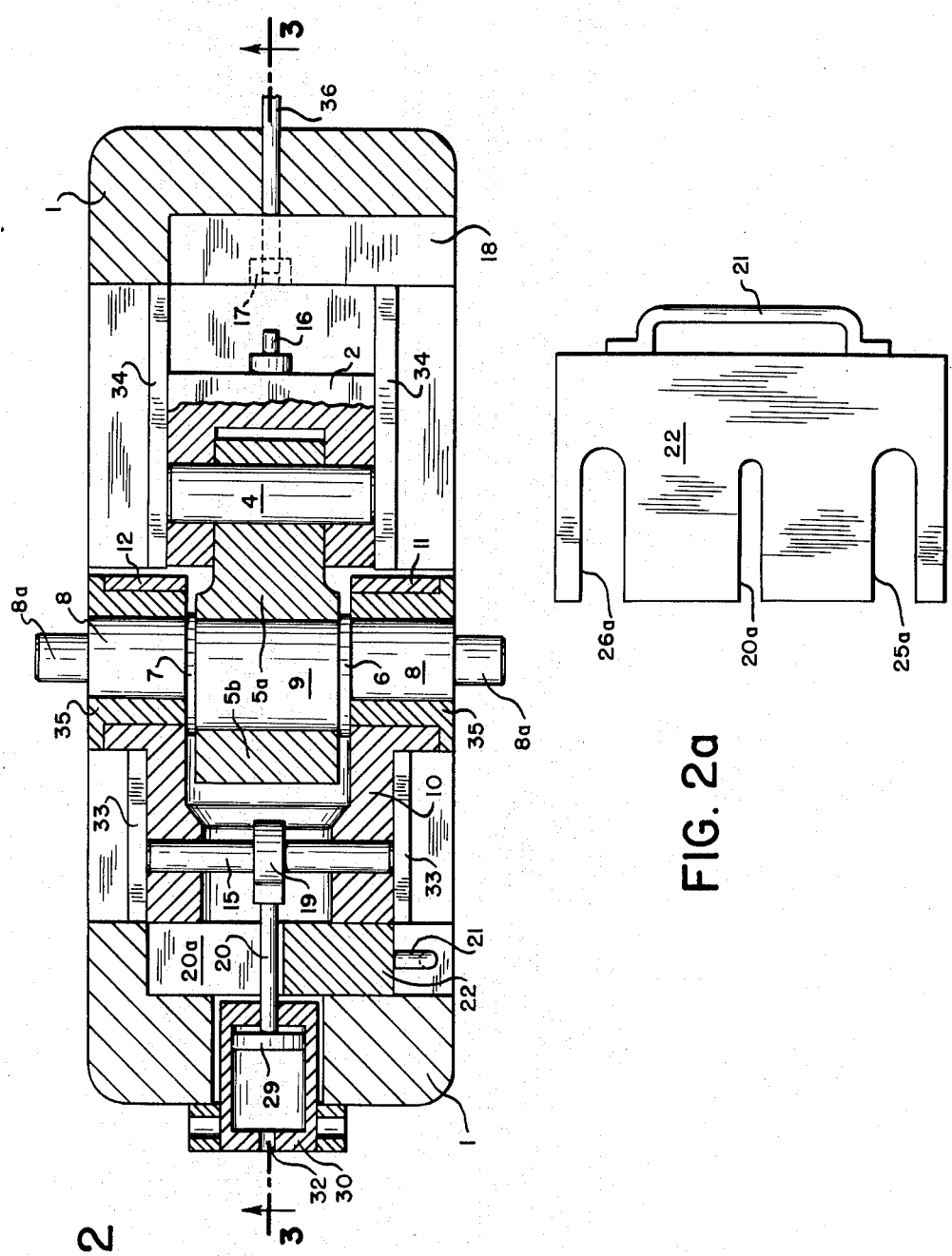
Figure 3:
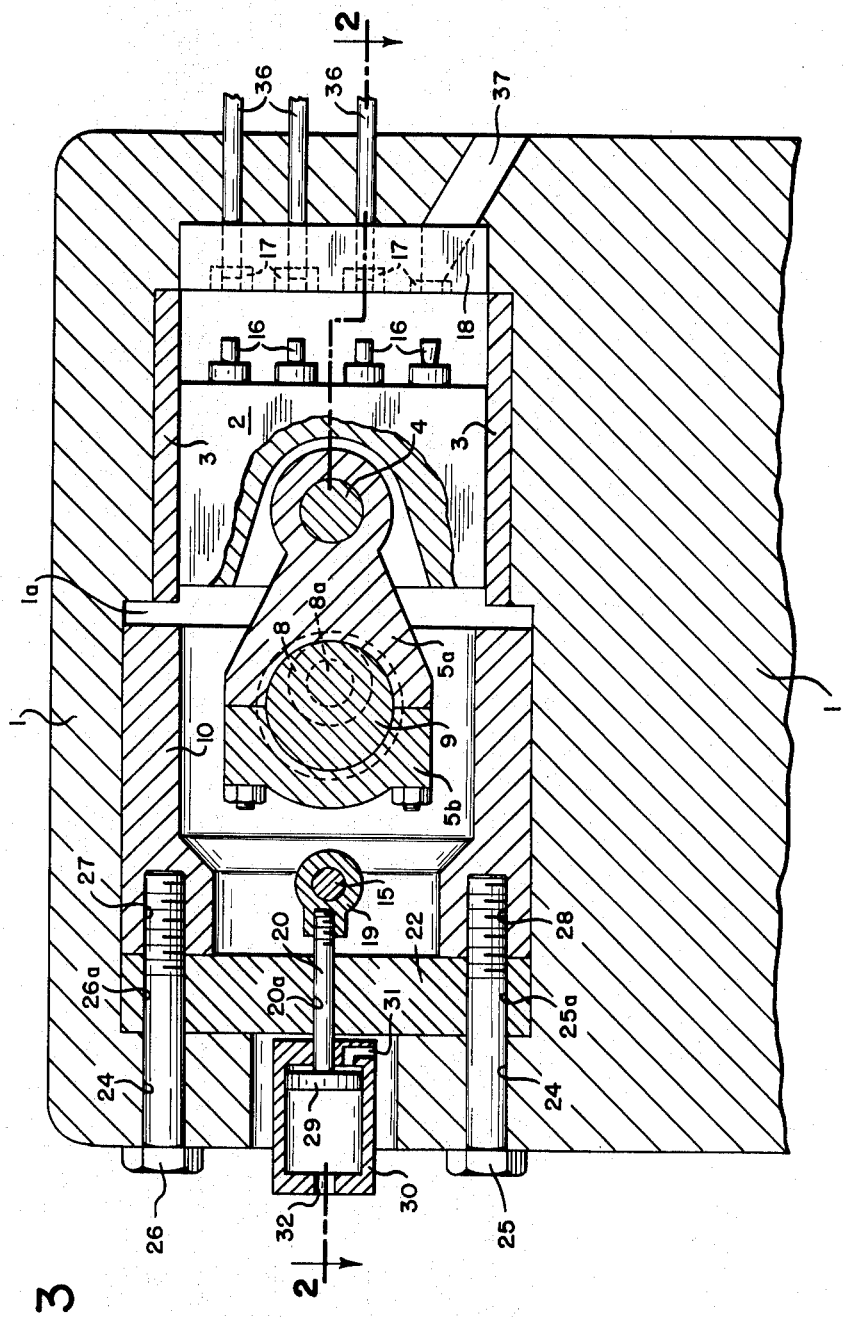

An embodiment of the improved machine, particularly including the parts pertinent to the features of the present invention is illustrated diagrammatically in the accompanying drawing, in which:

FIG. 1 is an elevational side view of the machine;
FIG. 2 is a sectional view taken on the line 2—2 of FIGS. 1 and 3;
FIG. 2a is an elevational view of the spacer block shown in FIGS. 1 to 3;
FIG. 3 is a sectional view taken on the line 3—3 of FIG. 2;
FIG. 4 is a sectional view taken on the line 4—4 of FIG. 1; and
FIG. 5 is a sectional view taken on the line 5—5 of FIG. 1.

The improved machine construction shown in the drawings comprises a frame 1 provided with a cavity 1a in which a tool carriage or slide 2 is mounted for reciprocation between top and bottom bearing plates 3 and upper and lower pairs of guiding and retaining plates 34 secured to the frame in the positions shown in FIG. 5. The carriage 2 is pivotally connected in a known manner by means of a pin 4 to a connecting rod comprising two parts 5a and 5b clamped to the crank pin 9 of a crankshaft. The crankshaft is provided with webs 6 and 7 at the respective sides of the connecting rod between the crank pin 9 and crankshaft journals 8 which are respectively rotatably mounted in bearings provided in bearing casings 10 slidably mounted in the cavity 1a. Projections 8a on the journals 8 are provided for drive wheels. The bearing casings 10 respectively include lateral projections 11 and 12 on the journals 8 which extend from the cavity of the frame respectively into guides or guideways 14 and 13 provided in the frame 1.

Because of the relatively small eccentricity of the crank pin 9 with respect to the crankshaft journals 8, the stroke of the tool slide 2 and tools 16 carried thereby with respect to the die matrices 17 mounted in the die block 18 is correspondingly small and provides very little work space between the slide 2 and the die block 18. Accessibility is further restricted since the tools 16 and the matrices 17 are mounted in large, heavy blocks, the slide or tool carrier 2 and the die block 18.

Accordingly, the heads of the bearing casings 10 are spaced from the inside end of the frame when in their normal position and that space is filled with a removable filler plate 22 which may be a solid block of steel fitting the space between the bearing casings 10 and the end of the cavity 1a in the frame. The filler plate 22 is provided with a handle 21 accessible through an opening 22a in the frame, through which the filler plate is adapted to be removed. The filler plate is provided with holes 23 opposite matching holes 24 in the end of the frame 1 through which screw bolts 25 extend and which are threaded respectively into threaded holes 26 and 27 extending respectively into the end of the bearing casings 10. When the screw bolts 25 are drawn up tightly, the plate 22 and the bearing casings 10 are secured firmly in a fixed position in which the crankshaft and tool carrier are in their normal operating positions in the frame.

When it is desired to work on or replace any of the tools 16 or matrices 17, adequate work space is provided between the retracted tool carrier 2 and the die block 18 by removing the bolts 25, sliding out the filler plate 22 through the opening 22a and retracting the bearing casings until they are brought into engagement with the end of the cavity 1a in the frame. During this retraction, the projecting portions of the bearings 11 and 12 slide respectively along the guideways 14 and 13 and the carrier 2 is retracted, with respect to its position shown in the drawing, to the extent of the thickness of the filler plate 22, which is made sufficient to provide ample work space.

Mechanism is provided in the machine for readily displacing or moving the casings 10 and the elements connected therewith toward and away from their positions for normal operation. This mechanism comprising a pin 15, the ends of which are located in the extended head portions of the bearing casings 10, this pin extending across a space back of the crankshaft within the casings, as shown. The mechanism also includes an eye-shaped member on the central portion of the pin 15 into which a rod 20 is screwed. This rod extends through a slot 28 in the filler plate 22 and may extend through the end of the frame for use in retracting the bearing casings in the manner described above.

For easily displacing the bearing casings 10, the rod 20 is employed as a piston rod connected to a piston 29 operable in a cylinder 30 fixed to the frame. The cylinder 30 includes connection openings 31 and 32 for connection in a known manner, to a source of air or other fluid under pressure, and a suitable valving arrangement, by which the fluid under pressure is admitted through the opening 31 for retracting the bearing casings 10, while the opening 32 is vented to atmosphere. When it is desired to move the bearing casings 10 back to their normal position, pressure fluid is admitted through the opening 32, and the opening 31 is vented to the atmosphere. When the bearing casings 10 are moved to the normal working position of the machine, as shown in the drawings, the filler plate 22 is inserted and the screw bolts 25 are inserted and drawn up tightly. The slot 28 in the plate 22 permits insertion and removal of the plate 22 with the rod 20 in place, as indicated in FIG. 2.

The present invention is primarily concerned with an improved machine construction for solving the problem of providing adequate space for working on the tools of machines of the type described, and not in specific details of construction of particular elements. For example, the frame of the machine may be built in a more or less conventional manner as a single steel casting or by welding or otherwise securing together heavy steel plates. Likewise the bearings mounted on the crankshaft may be of known conventional types of bearings for the purpose, and the cavity in the frame may be made in accordance with the particular structure of the bearing casings projecting thereinto, so that they are slidably mounted and fit the frame or suitable guides or tracks provided in the frame cavity. The bearing casings, which provide a relatively heavy structure in which the crankshaft is mounted, may comprise sections such as upper and lower sections bolted together, for example with countersunk screw bolts.

It is also to be understood that the bearing casings may be displaced by means other than that specifically described. For example, the bolts 25 may be removed and used after removing the filler plate 22, for displacing the bearing casings, by threading the bolts back partly into the holes 26 and 27 and pulling on them. Pushing on the heads of the bolts will return the bearing casings 10 to their normal positions. It is to be understood that the invention is not to be limited except as defined in the claims.

What is claimed is:

1. In a machine for pressing, punching or forming articles such as nuts, including a frame, a tool carrier slidably mounted in the frame, a crankshaft journaled in bearings mounted in the frame and connected to one side of the tool carrier by a connecting rod for reciprocating the tool carrier in a space between its other side and a fixed part of the machine, the improvement in which the crankshaft bearings are displaceably mounted in the frame for movement from their normal positions along with the crankshaft and tool carrier in a direction to substantially increase the width of said space between the tool carrier and said fixed part of the machine thereby facilitating repair and other work in said space, and means for positioning the crankshaft bearings in a position to locate the crankshaft in its normal operating position.

2. A machine as claimed in claim 1, including removable filler-block means bearing against a portion of the frame of the machine for positioning the bearings in their normal positions.

3. A machine as claimed in claim 2, including means for releasably securing the filler-block means and bearings in fixed relation to the frame.

4. A machine as claimed in claim 1, including means carried by the frame for displacing the crankshaft and its bearings and the tool carrier from and to their normal operating positions in the frame.

5. A machine as claimed in claim 4, in which the displacing means comprises a pressure fluid-operated cylinder and piston unit provided with a piston rod connected with the crankshaft bearings.

6. In a machine for pressing, punching or forming articles such as nuts, including a frame, a tool carrier slidably mounted in the frame, a crankshaft journaled in bearings mounted in the frame and connected to one side of the tool carrier by a connecting rod for reciprocating the tool carrier in a space between its other side and a fixed part of the machine, the improvement in which the crankshaft is journaled in bearing casings displaceably mounted in the frame for movement from their normal positions along with the crankshaft and tool carrier in a direction to substantially increase the width of said space between the tool carrier and said fixed part of the machine thereby facilitating repair and other work in said space, and means for positioning the bearing casings in a position to locate the crankshaft in its normal operating position.

7. A machine as claimed in claim 6, in which the frame has a cavity across which the crankshaft extends, said cavity extending a substantial distance in the frame on the side of the crankshaft opposite the tool carrier with said bearing casings extending thereinto from the position of the crankshaft, and a removable filler-plate in the cavity between the extending ends of the bearing casings and the wall of the cavity opposite the crankshaft, said filler-plate occupying the space between the bearing casings and said wall and positioning the crankshaft in its normal operating position.

8. A machine as claimed in claim 6, including means carried by the frame for displacing the crankshaft and its bearing casings and the tool carrier from and to their normal operating positions in the frame.

References Cited by the Examiner
FOREIGN PATENTS
738,880 10/1955 Great Britain.

ANDREW R. JUHASZ, *Primary Examiner.*